United States Patent [19]
Kitani et al.

[11] Patent Number: 5,967,168
[45] Date of Patent: Oct. 19, 1999

[54] METHOD OF CONNECTING BRANCH PIPE

[75] Inventors: Kenji Kitani, Higashiosaka; Shintaro Suzuki; Kosuke Sakai, both of Sanda, all of Japan

[73] Assignee: Waterworks Technology Development Organization Co., Ltd., Japan

[21] Appl. No.: 09/055,004

[22] Filed: Apr. 3, 1998

[30] Foreign Application Priority Data

Apr. 10, 1997 [JP] Japan ..................................... 9-091995
Apr. 11, 1997 [JP] Japan ..................................... 9-093703

[51] Int. Cl.$^6$ ............................. F16K 43/00; F16L 41/06
[52] U.S. Cl. .......................... 137/15; 137/318; 138/94.3; 251/326; 251/327; 251/329
[58] Field of Search ............................. 137/15, 315, 317, 137/318; 138/94.3; 251/152, 326, 327, 329

[56] References Cited

U.S. PATENT DOCUMENTS

| | | | |
|---|---|---|---|
| 473,997 | 5/1892 | Burritt | 137/318 |
| 511,327 | 12/1893 | Eley | 137/318 |
| 1,206,469 | 11/1916 | Rockwell | 251/326 |
| 1,488,229 | 3/1924 | Burns | 251/326 |
| 2,171,942 | 9/1939 | Mueller | 137/318 |
| 2,271,138 | 1/1942 | Hamer | 138/94.3 |
| 2,271,282 | 1/1942 | Young | 138/94.3 |
| 2,339,970 | 1/1944 | Young | 138/94.3 |
| 2,386,893 | 10/1945 | Hamer | 138/94.3 |
| 3,948,282 | 4/1976 | Yano | 137/318 |
| 4,719,936 | 1/1988 | Tsubakimoto et al. | 137/318 |
| 5,052,431 | 10/1991 | Jiles | 137/318 |
| 5,170,813 | 12/1992 | Francis | 137/318 |

FOREIGN PATENT DOCUMENTS

| | | |
|---|---|---|
| 0713047 | 5/1996 | European Pat. Off. . |
| 2739169 | 3/1997 | France . |
| 7113489 | of 1995 | Japan . |
| 1368751 | 10/1974 | United Kingdom . |

OTHER PUBLICATIONS

Patent Abstracts of Japan No. 07113489, published Feb. 5, 1995, entitled "Pipe Coupling and Installation Thereof" inventor Yokoyama Gunpei, 1 page.

Primary Examiner—George L. Walton
Attorney, Agent, or Firm—Webb Ziesenheim Logsdon Orkin & Hanson, P.C.

[57] ABSTRACT

A method of connecting a branch pipe to an existing main pipe is disclosed. The method includes the steps of: connecting and communicating a branch-pipe joint having a branching pipe portion to an existing main pipe; connecting a branch pipe to the branch-pipe joint; and communicating the branch pipe with the existing main pipe through the branch-pipe joint, with all these steps being effected while outflow of fluid from inside the main pipe being prevented. In the above method, the branch pipe is connected with a connecting pipe portion which in turn is connected with the branching pipe portion via a flange joint including a pair of flanges. A shutter plate is inserted between the pair of flanges of the flange joint and communicating the connecting pipe portion with the branching pipe portion thus preventing outflow of the fluid from the branching pipe portion. The flange joint is loosened while the connecting pipe portion is kept connected with the branch pipe so as to withdraw the shutter plate from between the flanges to allow communication between the branch pipe and the branching pipe portion. The flange joint is then tightened and the connecting pipe portion the branching pipe portion are connected and communicated with each other.

14 Claims, 14 Drawing Sheets

METHOD OF CONNECTING BRANCH PIPE

BACKGROUND OF THE INVENTION

1. Field of the Invention

The present invention relates to a method of connecting a branch pipe to an existing main pipe, and more particularly to a method including the steps of: connecting and communicating a branch-pipe joint having a branching pipe portion to an existing main pipe; connecting a branch pipe to the branch-pipe joint; and communicating the branch pipe with the existing main pipe through the branch-pipe joint, with all these steps being effected while outflow of fluid from inside the main pipe being prevented.

2. Description of the Related Art

According to the method of connecting a branch pipe described above, the series of steps until the branch pipe and the existing main pipe becomes communicated with each other take place while preventing outflow of the fluid from the main pipe. Thus, in case the main pipe comprises a water pipe for example, the branch-pipe connecting operation may be effected without troubling the users with such inconvenience as suspension of water supply.

In the above method, as exemplified by the Japanese laid-open patent gazette Hei. 7-113489, a branch-pipe joint incorporating a sluice valve capable of opening/closing the branching pipe portion is connected and communicated with the existing main pipe while preventing fluid outflow therefrom. After the communication has been established between the branch-pipe joint and the main existing pipe, the sluice valve is operated to prevent outflow of the fluid, and then the branch pipe is connected with this sluice valve.

With the above-described conventional method, the method requires the branch-pipe joint having the sluice valve capable of opening/closing the branching pipe portion. Hence, the branch-pipe connecting operation is costly.

The present invention attends to the above-described drawback of the prior art and a primary object of the invention is to provide an improved method of connecting a branch pipe to an existing main pipe which method allows the branch-pipe connecting operation at lower cost through an ingenious modification of the conventional method.

SUMMARY OF THE INVENTION

For accomplishing the above-noted object, according to the features of the present invention, in the method described as above, the method comprises the steps of: connecting the branch pipe with the connecting pipe portion which in turn is connected with the branching pipe portion via a flange joint including a pair of flanges; inserting a shutter plate between the pair of flanges of the flange joint and communicating the connecting pipe portion with the branching pipe portion thus preventing outflow of the fluid from the branching pipe portion; loosening the flange joint while the connecting pipe portion is kept connected with the branch pipe so as to withdraw the shutter plate from between the flanges to allow communication between the branch pipe and the branching pipe portion; tightening the flange joint; and connecting and communicating the connecting pipe portion with the branching pipe portion.

With the above method, the connecting/communicating operation between the branch pipe and the branch-pipe joint may be effected without using the sluice valve therebetween, so that the operation may be effected at lower costs.

According to a further feature of the invention, the branch-pipe joint includes a case-forming member which is disposed about an outer peripheral face of the existing main pipe to be secured thereto and a through hole is defined in a pipe wall of the existing main pipe through the branching pipe portion so as to connect and communicate the branching pipe joint with the existing main pipe through the through hole.

With the above, the case-forming member is secured to the outer peripheral face of the existing main pipe and the through hole is defined in the pipe wall of the main pipe through the through hole. Hence, the branch-pipe joint per se may be conveniently utilized as a portion of the work enclosure case adapted for preventing outflow of the fluid from inside the main pipe for the purpose of defining the through hole in the pipe wall of the existing main pipe.

According to a still further feature of the invention, an amount of loosening of fastener bolts which fasten the flanges together for binding the shutter plate therebetween when the shutter plate is to be withdrawn is restricted within a predetermined range.

With the above, it is possible to avoid over-loosening of the fastener bolts which may lead to accidental outflow of a great amount of fluid from between the flanges.

According to a still further feature of the invention, the fastener bolt is threaded with one of the flanges binding the shutter plate therebetween, and the fastener bolt includes a contact member which comes into contact with the flange as the fastener bolt is loosened, thereby to restrict the amount of loosening within the predetermined range.

With the above, the flange joint may be conveniently loosed within the predetermined range simply by a threading operation of the fastener bolt relative to the one flange.

According to a still further feature of the invention, the shutter plate forms, at an end thereof, an engaging portion against which a pulling jig used for withdrawing the shutter plate from between the flanges comes into disengageable engagement, and the shutter plate is bound between the flanges with the engaging portion projecting from between the flanges.

With the above, the engaging portion is formed at the one end of the shutter plate and the shutter plate is bound between the flanges with the engaging portion projecting therefrom. Then, when the shutter plate is withdrawn, the pulling jig is pulled as engaged with the engaging portion. Accordingly, in comparison with a different conceivable construction in which a large shutter plate to which the pulling jig is attached in advance is bound between the flanges and this large shutter plate is bound between the flanges with the pulling jig projecting therefrom, with the above-described construction, the pulling or withdrawing operation will be less likely to be interfered with by the portion of the plate projecting from between the flanges.

Further and other objects of the invention will become apparent from the following detailed description of a preferred embodiment of the invention with reference to accompanying drawings.

DETAILED DESCRIPTION OF THE PREFERRED EMBODIMENT

A preferred embodiment of a method of connecting a branch pipe, relating to the invention will now be described in details with reference to the accompanying drawings.

Figure 1:
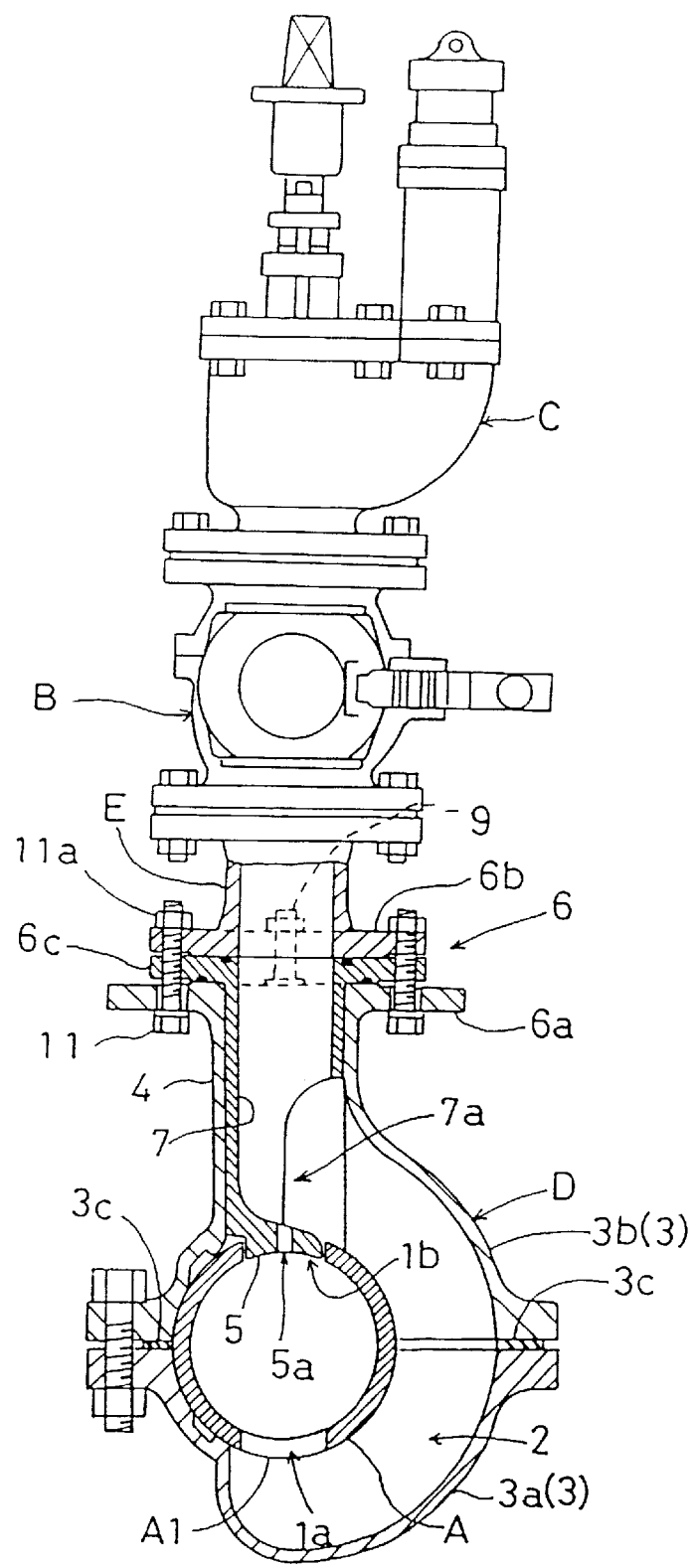
FIG. 1 is a front view in partial section showing a connecting construction of a branch pipe.
Figure 2:
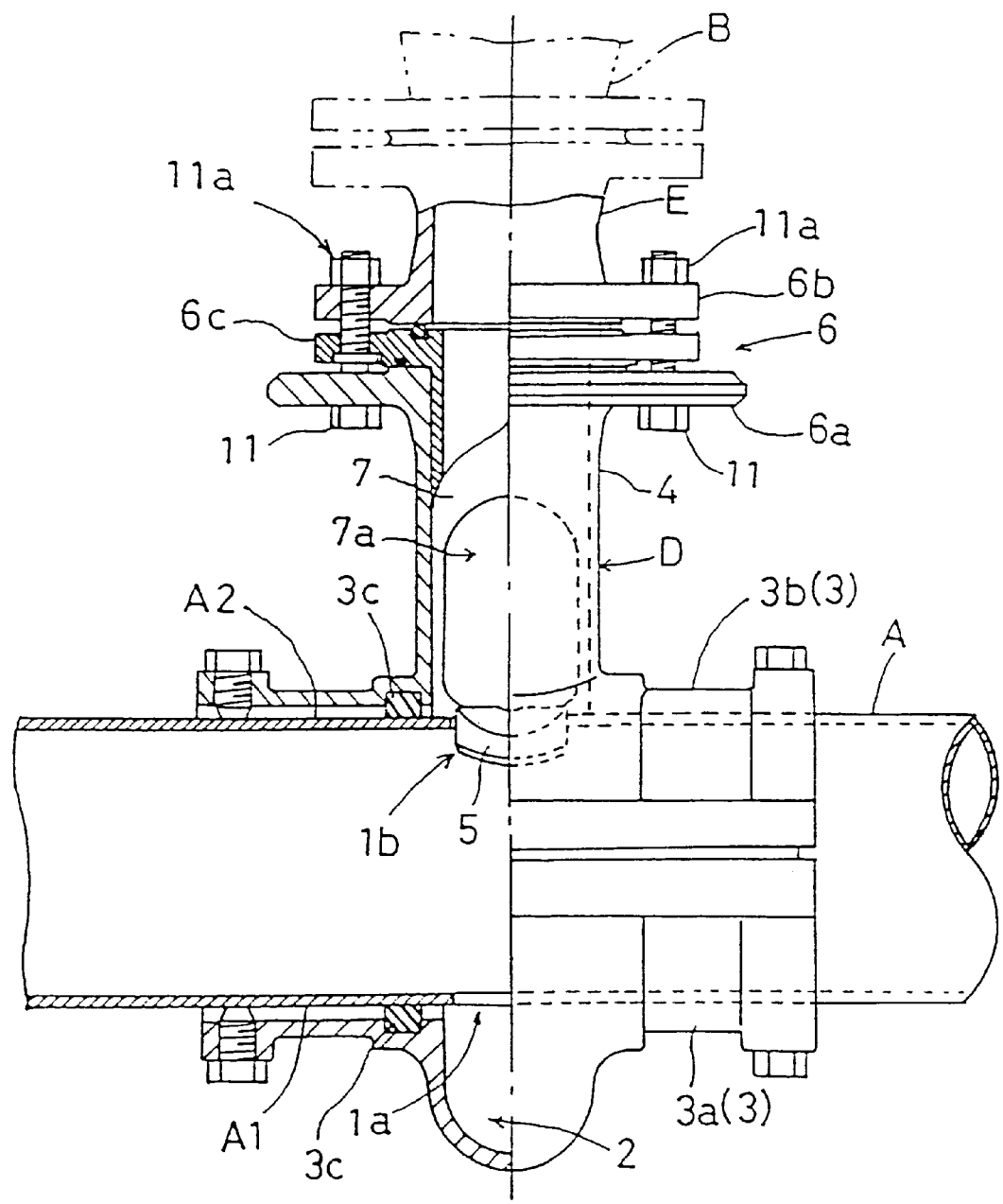
FIG. 2 is a side view in partial section showing the connecting construction of the branch pipe.

FIGS. 1 and 2 show a connecting construction of a branch pipe, relating to this embodiment. In this construction, an existing water pipe A installed under the ground, as an example of an 'existing main pipe', and a branch pipe B connected with a fire hydrant C and incorporating a ball valve, as an example of a 'branch pipe', are connected and communicated with each other via a branch-pipe joint D made of ductile cast iron. The branch-pipe joint D is adapted for connecting and communicating the existing water pipe A and the branch pipe B through a guide flow passage 2 formed in a spiral form between an outer peripheral face of the water pipe A and this joint D and extending along the periphery of the main pipe from a lower portion to an upper portion thereof and through a lower through hole 1a defined in a lower pipe wall A1 of the existing water pipe A to be communicated with the lower inner region of this guide flow passage 2.

The branch-pipe joint D includes a cylindrical passage-forming member 3 to be secured to the outer peripheral face of the existing water pipe A in a water-tight manner and a branching pipe portion 4 formed integrally with the passage-forming member 3 for enabling the connection of the branch pipe. Further, a closing member 5 is provided for closing an upper through hole 1b defined in an upper pipe wall A2 of the water pipe 2 for allowing access for an operation for defining a lower through hole 1a. Then, a guide flow passage 2 is formed between the outer peripheral face of the existing water pipe A and the inner peripheral face of the passage-forming member 3. Also, the branch-pipe joint D is oriented substantially vertical along the radial direction of the existing water pipe so that a branching pipe portion 4 of this joint D may be opened at an upper area inside the guide flow passage 2.

The branch pipe B is adapted to be connected with a short pipe E as a 'connecting pipe portion' to be connected with the branching pipe portion 4 via a flange joint 6. In operation, tap water flowing from through the lower through hole 1a of the water pipe A is guided along the outer peripheral face of the water pipe A to the upper peripheral portion thereof into the branching pipe portion 4, then, this water is guided through the branch pipe B connected with the short pipe E to be eventually discharged from the fire hydrant C.

The passage-forming member 3 is provided in a cylindrical shape extending along and over the outer peripheral face of the existing water pipe A. And, this member 3 includes upper and lower separate members 3a, 3b which are separated from each other so as to bind the outer peripheral face of the water pipe A therebetween and are secured to the water pipe A under this condition. And, these separate members 3a 3b are radially bulged along the peripheral direction of the water pipe A thereby forming the guide flow passage 2 inside these separate members 3a, 3b. The guide flow passage 2 has a substantially constant diameter from a portion thereof immediately below the lower through hole 1a of the water pipe A along the periphery of the same. Rubber packing elements 3c are fitted between the separate members 3a, 3b and the water pipe A and between the two separate members 3a, 3b, respectively.

Accordingly, this passage-forming member 3 is provided as a case-forming member for surrounding the outer peripheral face of the water pipe and fixed thereto; and the branch-pipe joint D comprises the assembly of this case-forming member 3 and the branching pipe portion 4 assembled to be connected and communicated therewith.

The closing member 5 is formed integrally with a lower end of a round and cylindrical member 7 to be fitted within the branching pipe portion 4 and defines an air vent hole 5a at the center thereof The cylindrical member 7 includes a fixing flange 6c which is fastened together between an upper flange 6a formed at the upper portion of the branching pipe portion 4 and a lower flange 6b formed at a lower portion of the short pipe E, and an opening 7a communicated with the guide flow passage 2.

Then, as the cylindrical member 7 with its opening 7a oriented toward the guide flow passage 2 is fixedly bound between the upper flange 6a and the lower flange 6b by means of the fixing flange 6c, the closing member 5 is inserted into the upper through hole 1b with a gap (f) (see FIG. 5) being formed between this member 5 and the peripheral edge of the upper through hole, so that the closing member 5 closes this upper through hole 1b.

Next, a method of connecting the branch pipe will be explained with reference to FIGS. 12 through 18. This method includes a series of steps for fixing the branch-pipe Joint D to the existing water pipe A installed under the ground; connecting the branch pipe B to the branching pipe portion 4 via the short pipe E; and establishing communication between the branch pipe B and the existing water pipe A via the branching pipe joint D, with these operations being effected without suspending the flow of tap water inside the existing water pipe A by preventing outflow of the tap water from the branch-pipe joint D.

Figure 12:
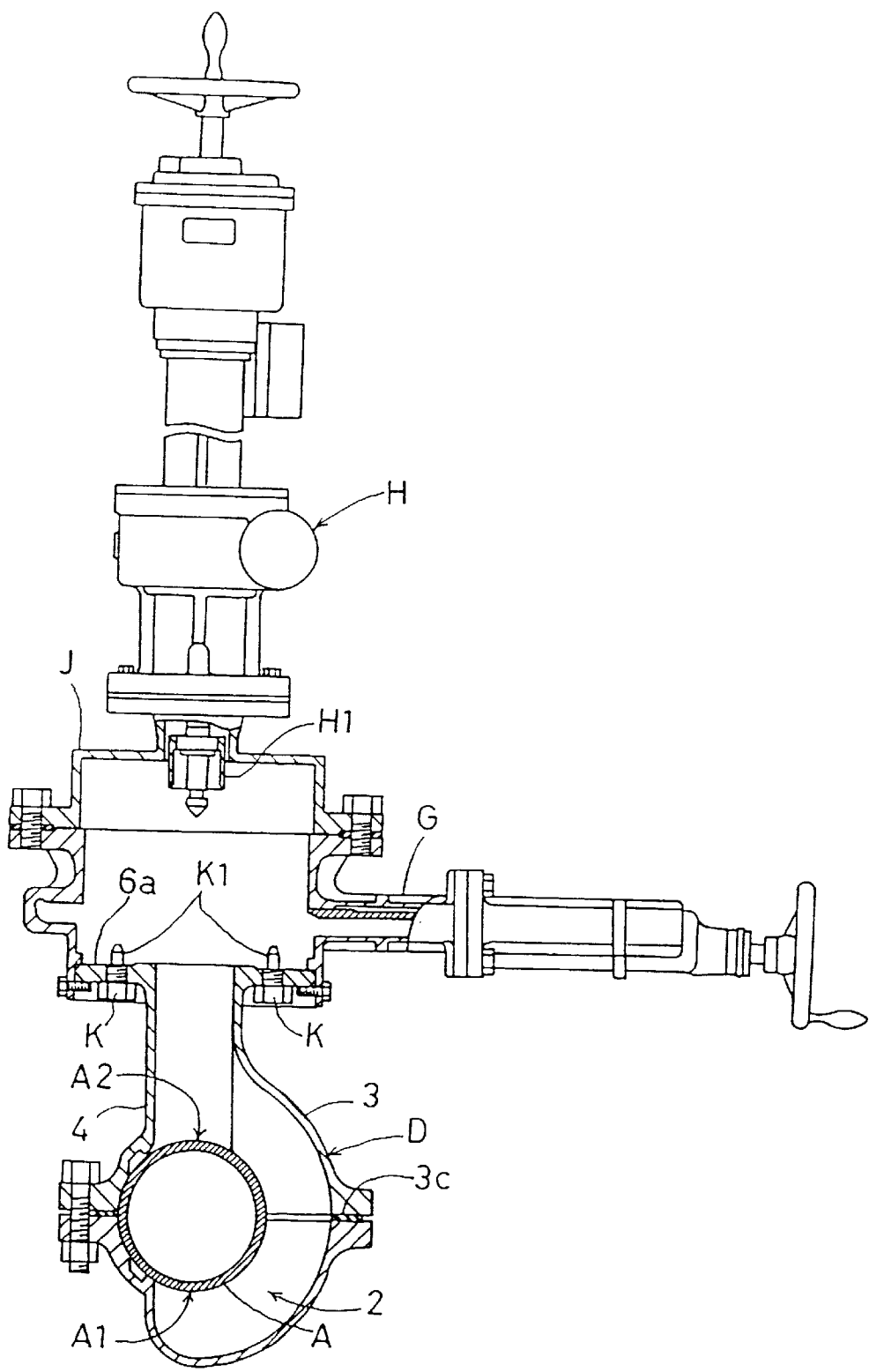
FIGS. 12–18 are descriptive views of a method of connecting a branch pipe.

Specifically, a pit is dug at a site where the fire hydrant C is to be installed so as to expose the existing water pipe A. After cleaning the outer peripheral face of this pipe A, the separate members 3a, 3b fitted with the packing element 3c are fixedly connected with this outer peripheral face in a water-tight manner, thus forming the guide flow passage 2 between the inner peripheral face of the passage-forming member 3 and the outer peripheral face of the existing water pipe A. Then, as shown in FIG. 12, a sluice valve G for the connecting operation is attached to the branching pipe portion 4 and a first enclosure case J within which a disc cutter H1 of a boring machine H is set is fixed to this sluice valve G.

Incidentally, in a bolt hole defined in the upper flange 6a of the branching pipe portion 4, there is threaded a water-stopper bolt K including a guide pin K1 for fixing the cylindrical member 7 in position.

Figure 13:
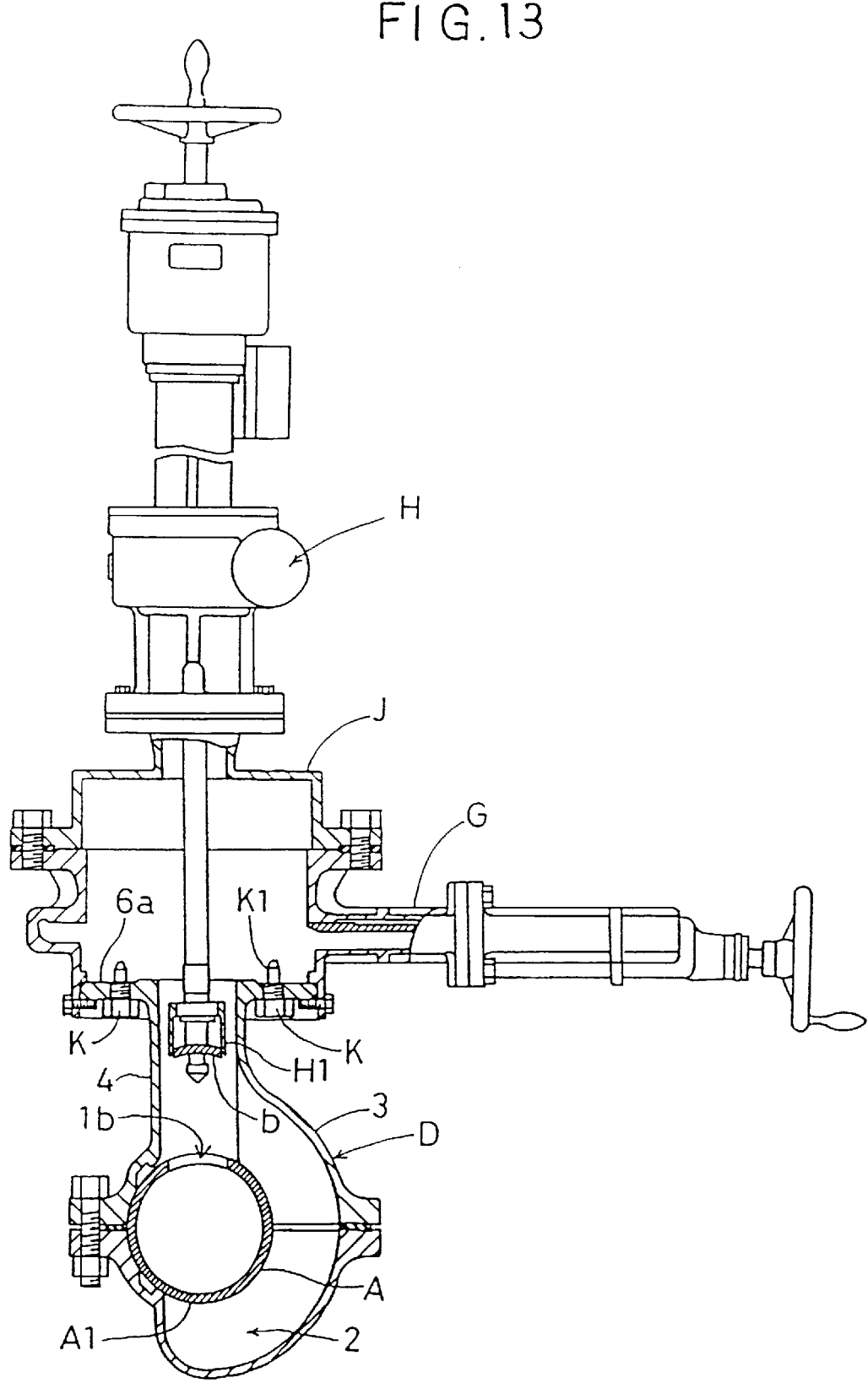
Figure 14:
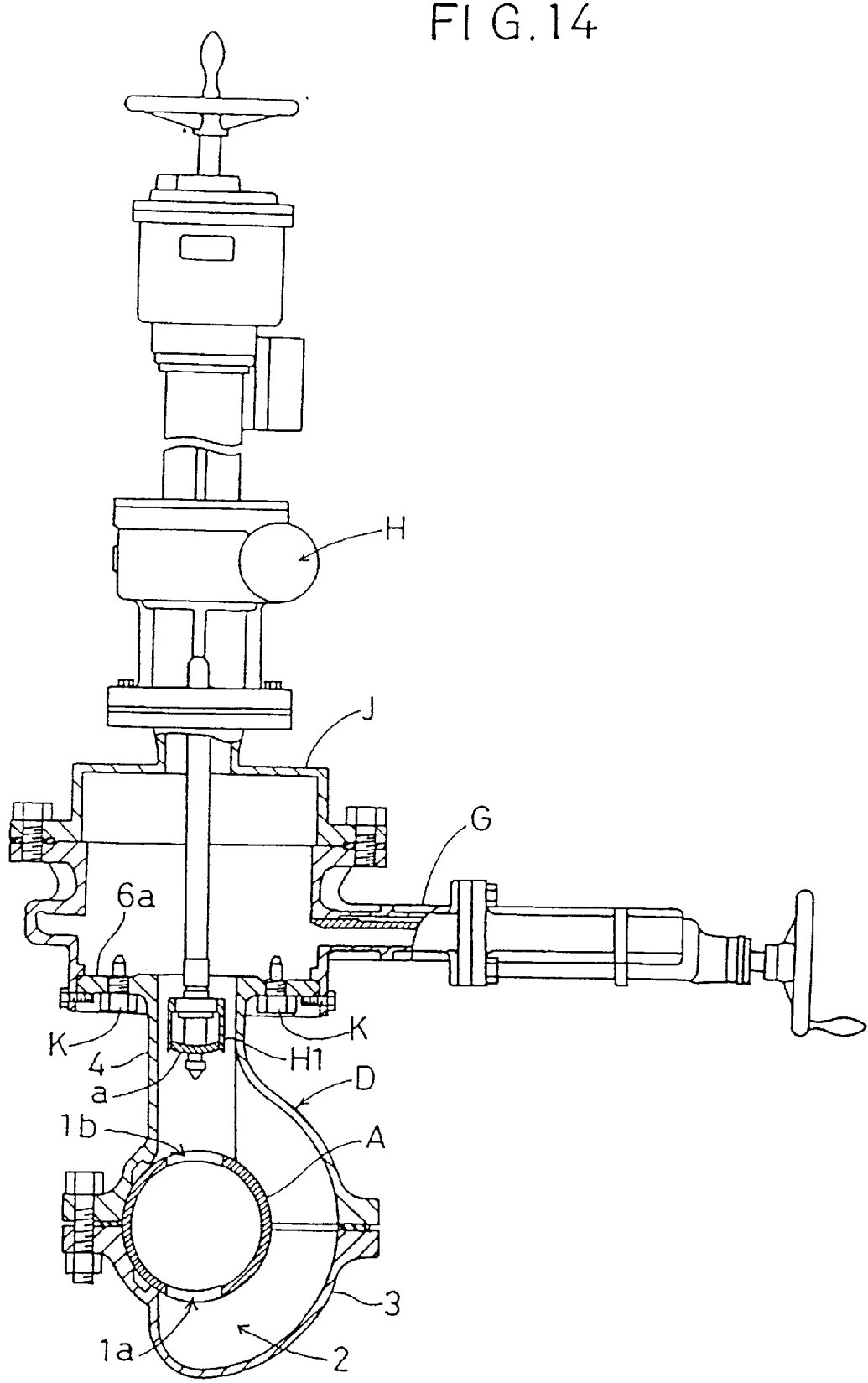

Next, as shown in FIG. 13, the sluice valve G is opened and the cutter H1 is inserted through the branching pipe portion 4 into the guide flow passage 2. Then, this cutter H1 is operated to define, in the upper pipe wall A2, an upper access through hole 1b for the purpose of defining the lower through hole 1a in the lower pipe wall A1 of the existing water pipe A. After this, the cutter H1 retaining a cut piece (b) of the upper through hole 1b is lifted above the sluice valve G, and then the sluice valve G is closed and the cut piece (b) is removed from the cutter H1. Then, as shown in FIG. 14, the cutter H1 is again inserted into the existing water pipe A through the upper through hole 1b so as to define the lower through hole 1a in the lower pipe wall A1 of the existing water pipe A. And, the cutter H1 retaining a cut piece (a) of this hole is lifted above the sluice valve G; and then the sluice valve G is closed and the boring machine H together with the first enclosure case J is removed from the sluice valve G.

Figure 3:
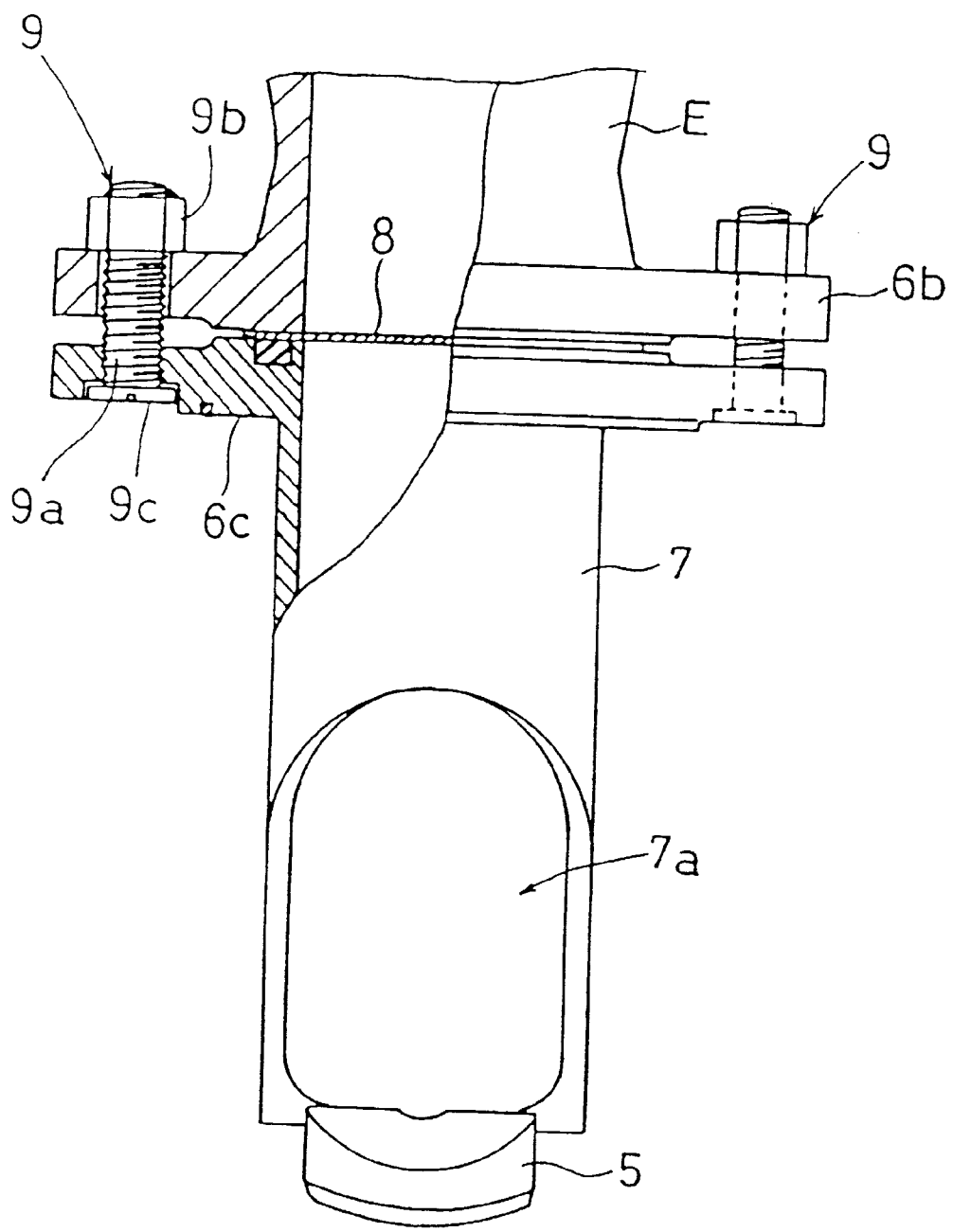
FIG. 3 is a side view in partial section showing a temporary fixing condition between a short pipe and a cylindrical member.
Figure 15:
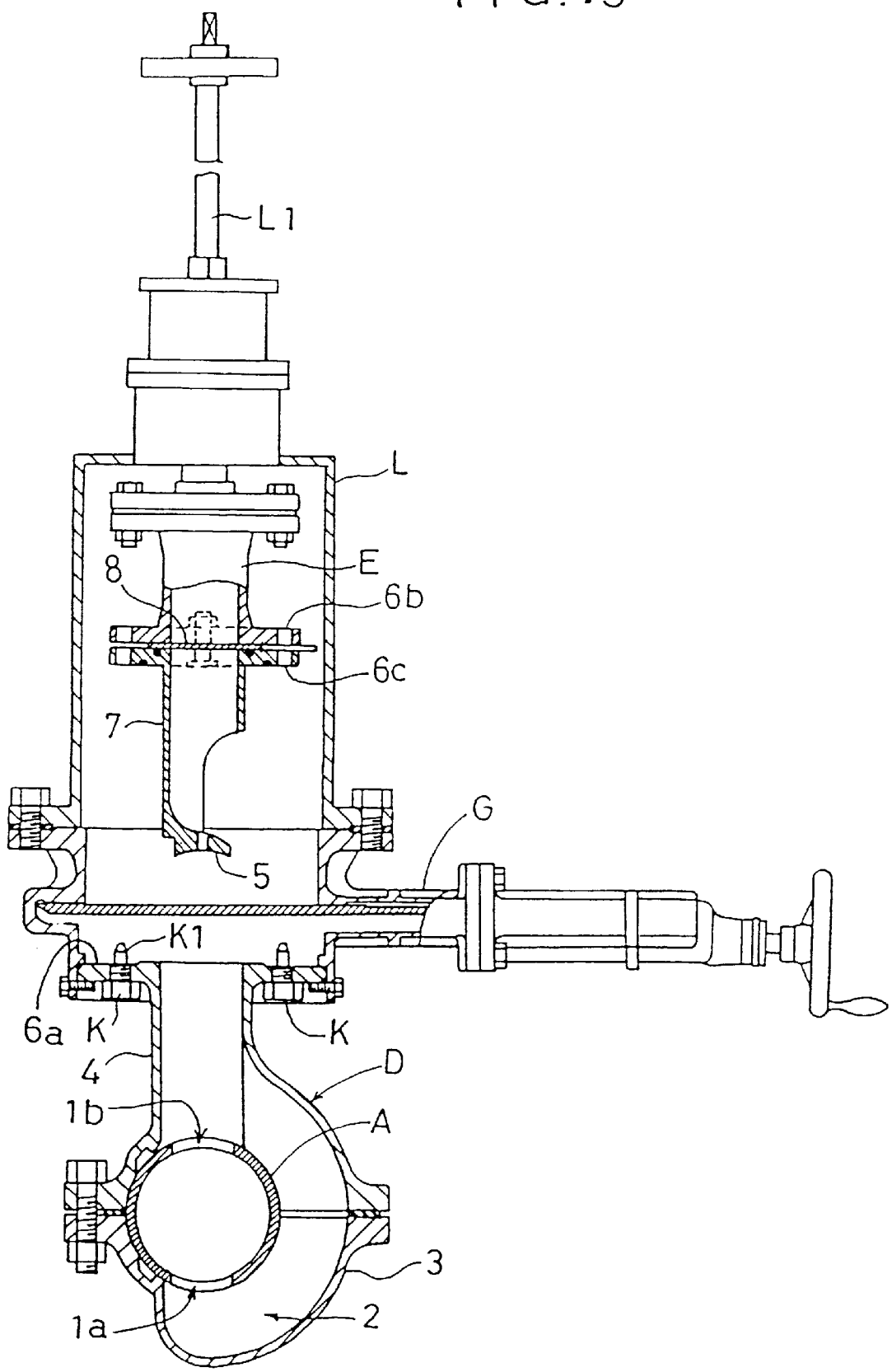

Thereafter, as shown in FIG. 15, a second enclosure case L within which the short pipe E connected with a control member L1 for a lifting operation and the cylindrical member 7 are set is fixed to the sluice valve G. To the lower flange 6b of the short pipe E set within the second enclosure case L, as shown in FIG. 3, the cylindrical member 7 is bolt-fixed in advance by using the fixing flange 6c. The lower flange 6b and the fixing flange 6c as binding therebetween include a shutter plate 8 for shutting the branching pipe portion 4 while allowing withdrawal of the plate 8 in the radial direction. The lower flange 6b and the fixing flange 6c are temporarily fixed by fastener bolt/nuts 9 attached at two positions opposed to each other along the radial direction of the flanges.

Figure 4:
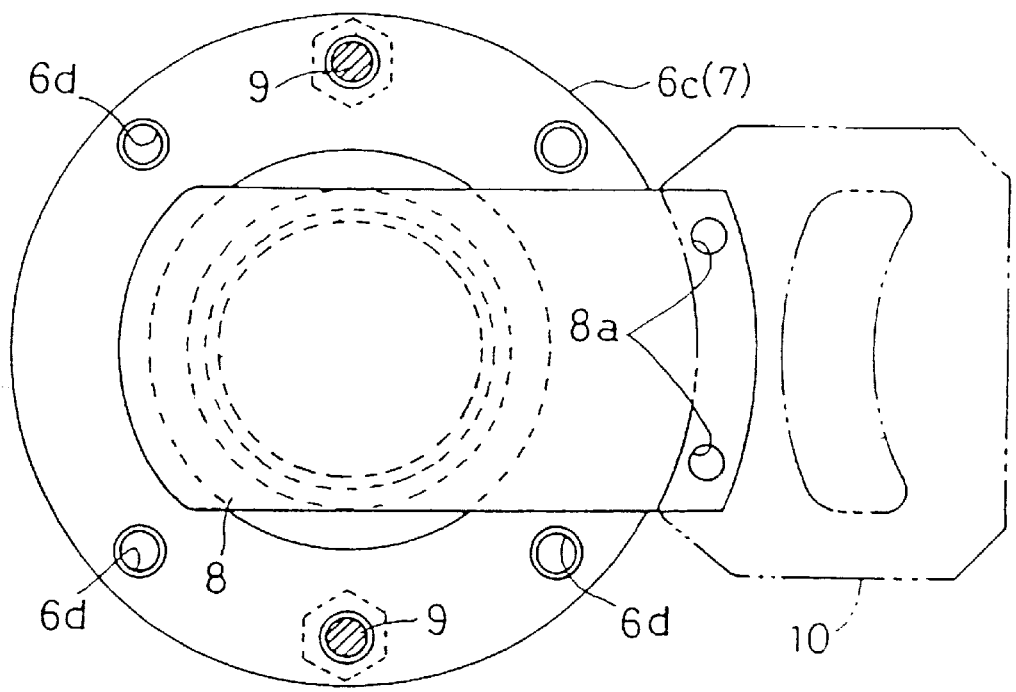
FIG. 4 is a plan view showing an attaching portion of a shutter plate for shutting a branching pipe portion.

At one end of the shutter plate 8, as shown in FIG. 4, there are defined two engaging holes 8a acting as 'engaging portions' against which a pulling jig 10 used for withdrawing the shutter plate 8 from between the lower flange 6b and the fixing flange 6c comes into disengageable engagement. And, the fastener bolt/nuts 9 fasten the shutter plate 8 with the engaging holes 8a projecting from between the flanges 6b, 6c.

Figure 6:
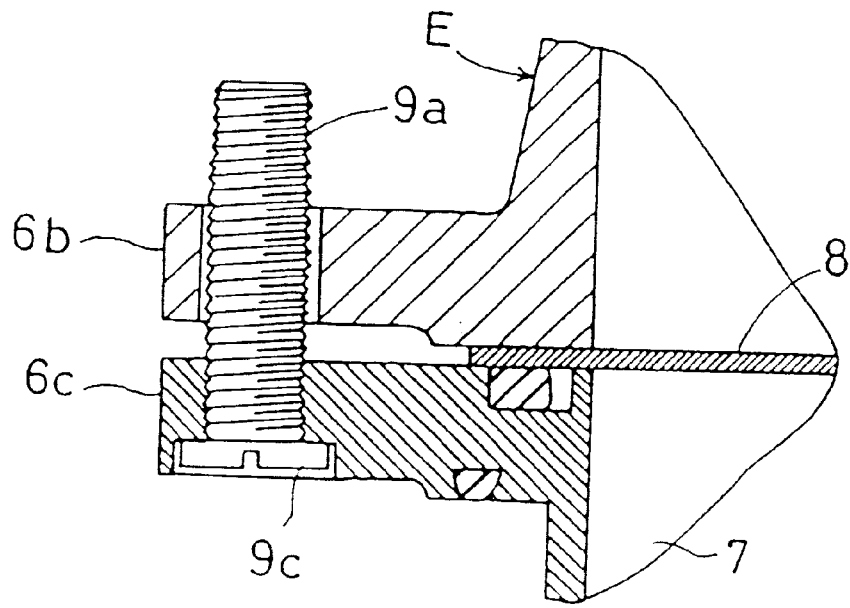
FIG. 6 is a partial section illustrating an operation for fixing the shutter plate with opposed flanges.
Figure 7:
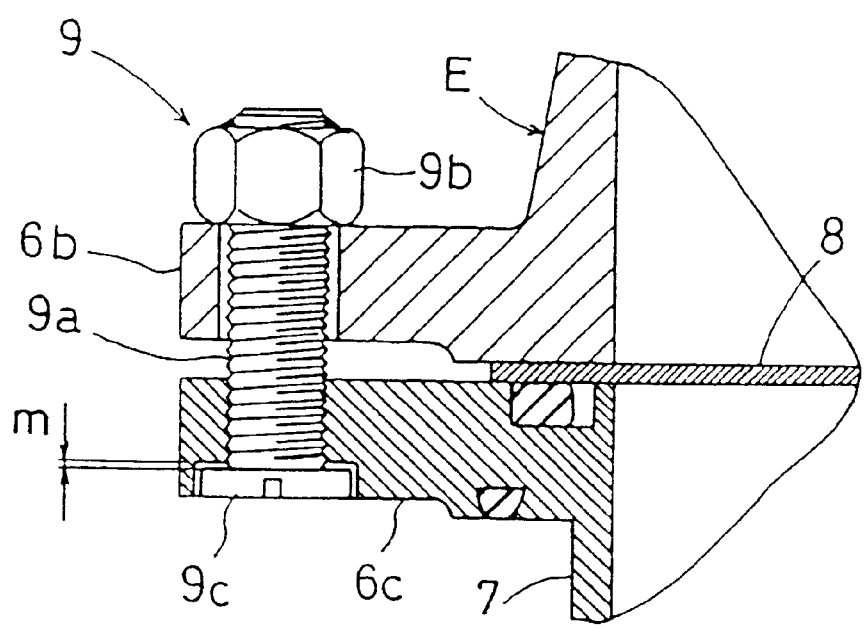
FIG. 7 is a partial section illustrating the operation for fixing the shutter plate with the opposed flanges.

FIGS. 6 and 7 illustrate the procedure for fixing the lower flange 6b and the fixing flange 6c and binding the shutter plate 8 therebetween by means of the fastener bolt/nuts 9. Specifically, as shown in FIG. 6, a headed bolt 9a as a fastener bolt having a flat head 9c defining a groove into which a leading end of a screw driver is inserted is threaded into the fixing flange 6c until the flat head 9c comes into abutment against the lower face of the fixing flange 6c. Next, by rotating this headed bolt 9a by a predetermined fixed amount, e.g. a half rotation amount, a gap (m) is formed between the flat head 9c and the lower face of the fixing flange 6c. Thereafter, as shown in FIG. 7, a nut 9b is threaded onto the leading end of the headed bolt 9a projecting from the lower flange 6b, thereby to fasten together the lower flange 6b and the fixing flange 6c, binding the shutter plate 8 therebetween. Under this fixed condition, the headed bolt 9a and the nut 9b are welded together so as to be rotated in unison.

Accordingly, the headed bolt 9a is threaded with the fixing flange 6c which is one of the pair of the flanges 6b, 6c binding the shutter plate 8 therebetween; and this headed bolt 9a includes the flat head 9c acting as a 'contact member' which comes into contact with the flange 6c as the headed bolt 6a is loosened by means of the nut 9b, so that the amount of loosening of the headed bolt 9a when the shutter plate 8 is withdrawn is restricted within the predetermined fixed amount.

Figure 16:
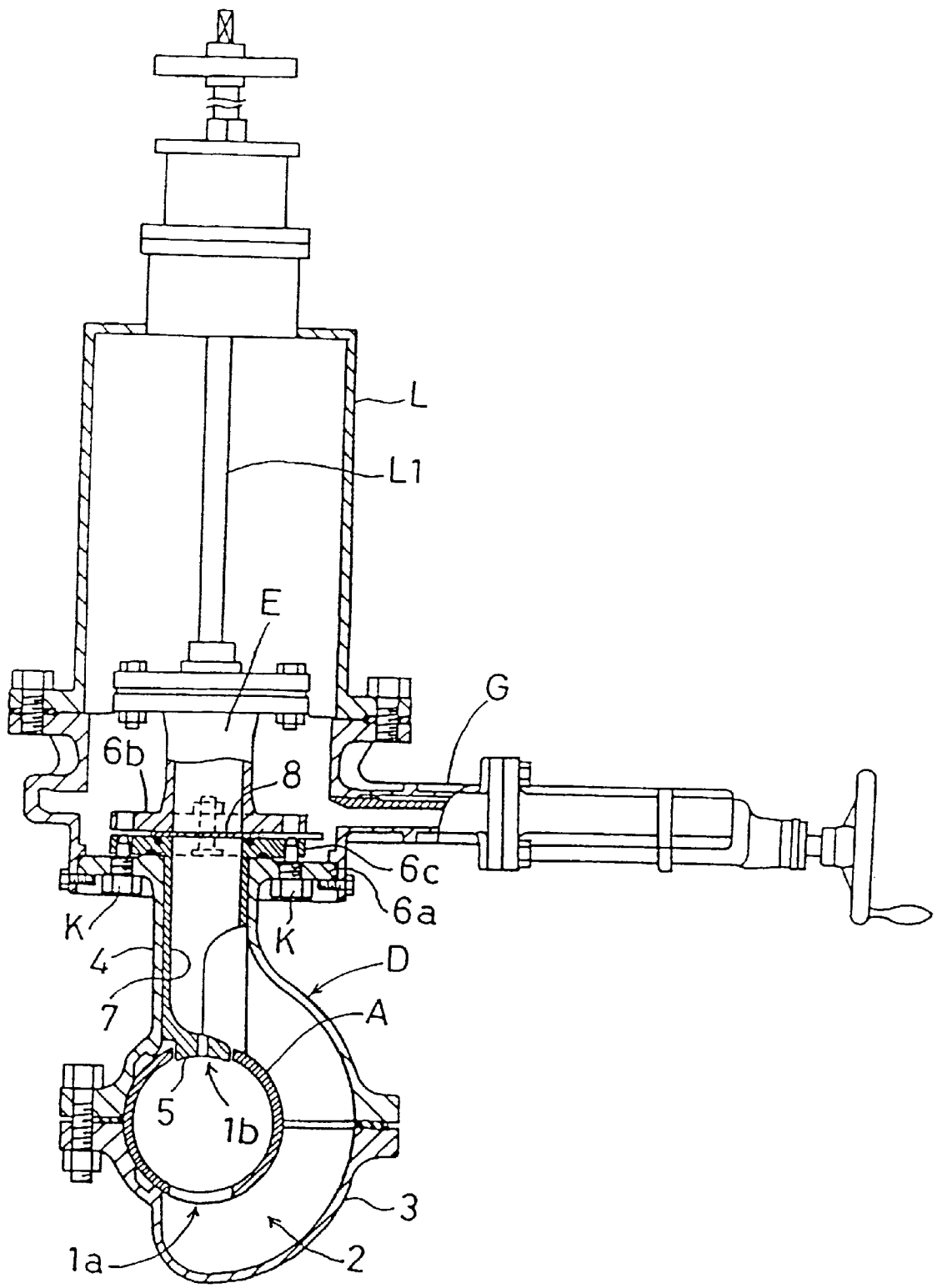
Figure 17:
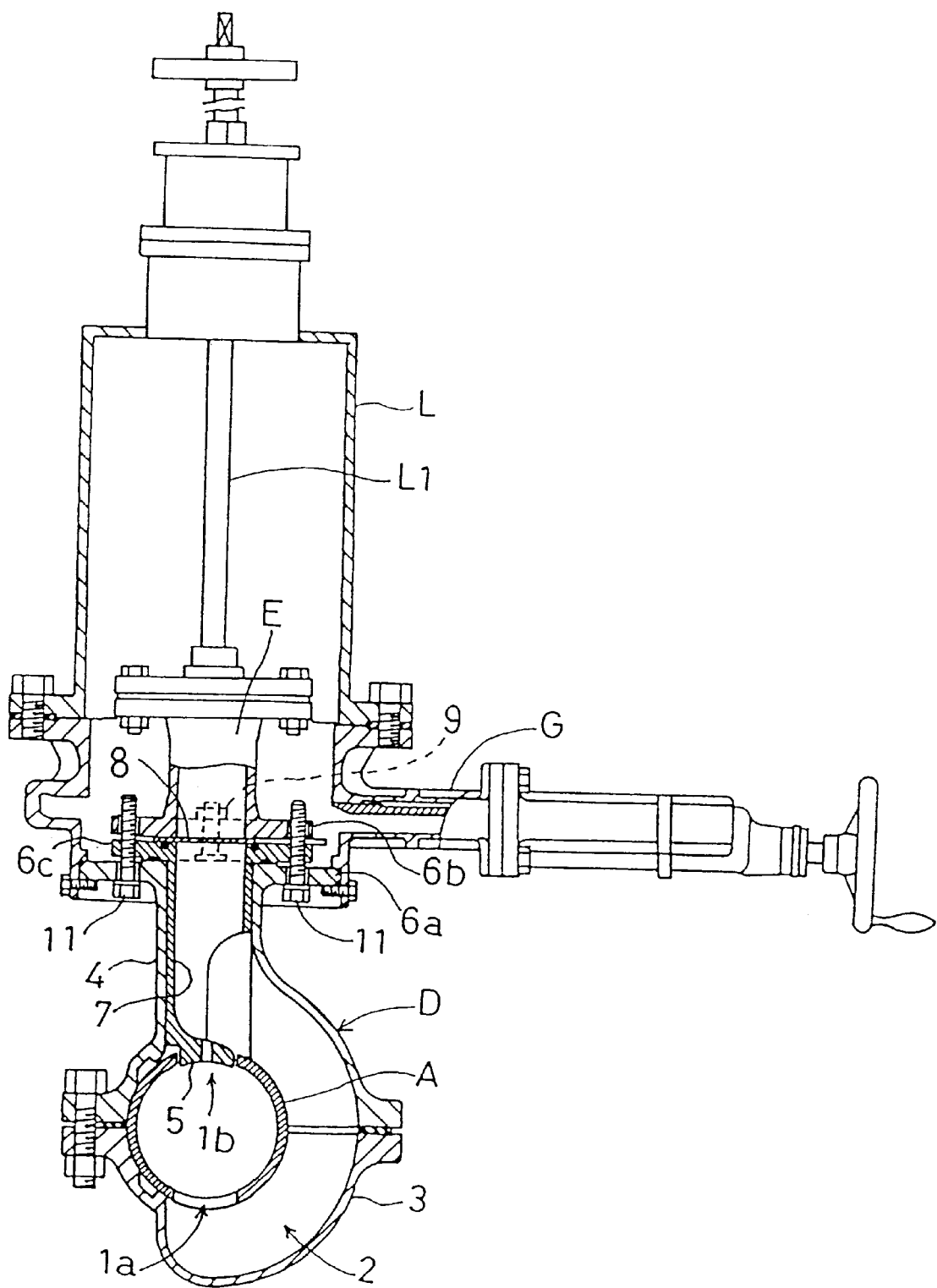

Next, as shown in FIG. 16, by opening the sluice valve G and then operating the control member L1, the short pipe E and the cylindrical member 7 are lowered through the branching pipe portion 4 until the fixing flange 6c of the cylindrical member 7 comes into contact with the upper flange 6a of the branching pipe portion 4 and the guide pins K1 of the water stopper bolts K are introduced into and fixed in position within connecting bolt holes 6d (see FIG. 4) defined at four positions in the fixing flange 6c. Thereafter, as the water-stopper bolts K are removed, the connecting bolts 11 introduced in place of the water-stopper bolts K are threaded into the fixing flange 6c, thereby connecting the short pipe E to the branching pipe 4 via the flange joint 6.

Figure 5:
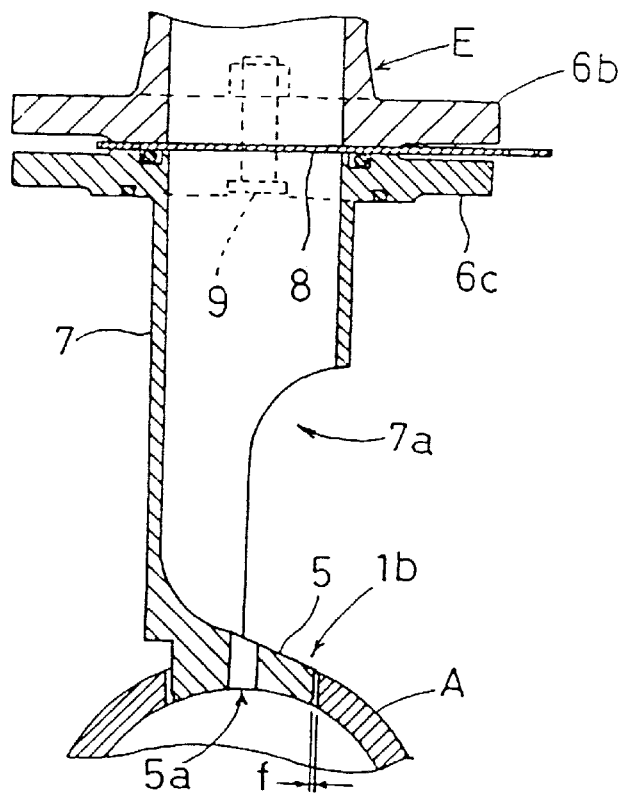
FIG. 5 is a partial section illustrating a condition in which the shutter plate is used for preventing outflow of water from the branching pipe portion.

Accordingly, in this condition, as shown in FIG. 5, the closing member 5 introduced through the branching pipe portion 4 is set into the upper through hole 1b, thus closing this upper through hole 1b, and also outflow of tap water from the branching pipe portion 4 is prevented by the shutter plate 8.

Figure 18:
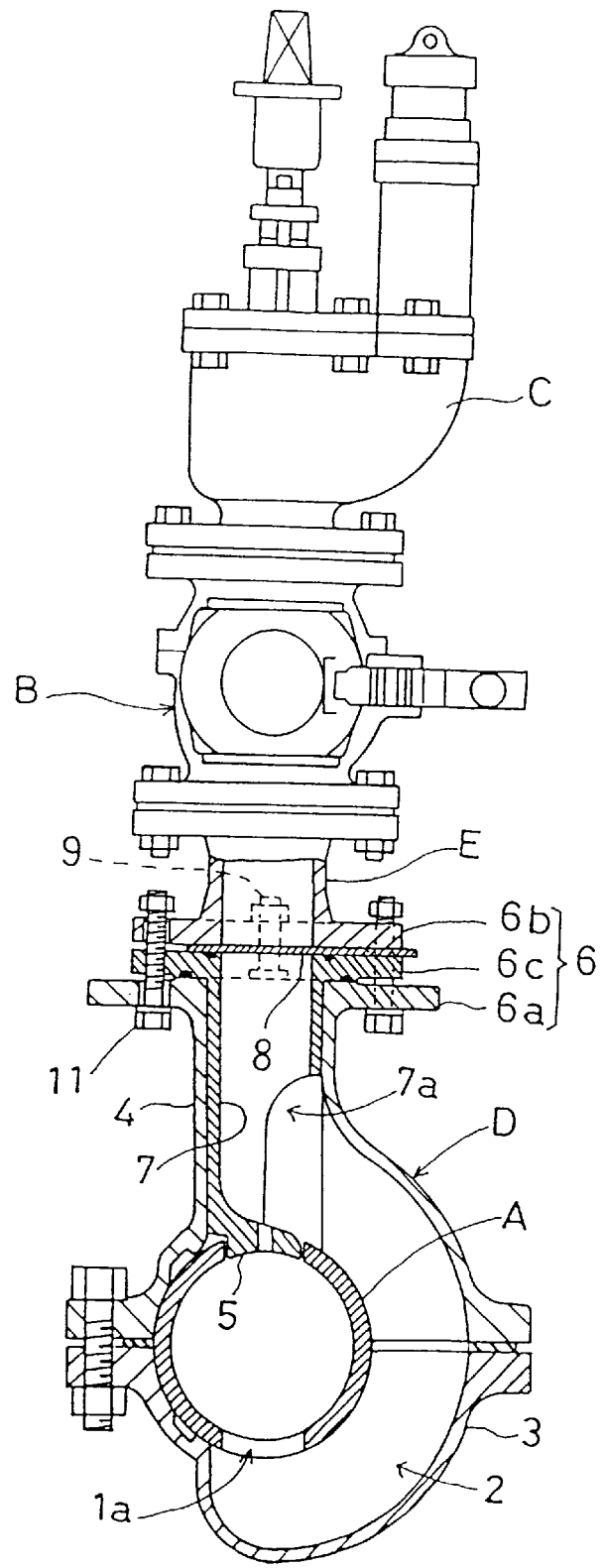

Next, the connection between the second enclosure case L and the sluice valve G is released, and this second enclosure case L is lifted along the control member L1. Then, the connection between the control member L1 and the short pipe E is released, and the second enclosure case L is removed from the sluice valve G. Further, the sluice valve G is removed from the branching pipe portion 4, and as shown in FIG. 18, the branch pipe B is connected with the short pipe E and then the fire hydrant C is connected with this branch pipe B.

Figure 8:
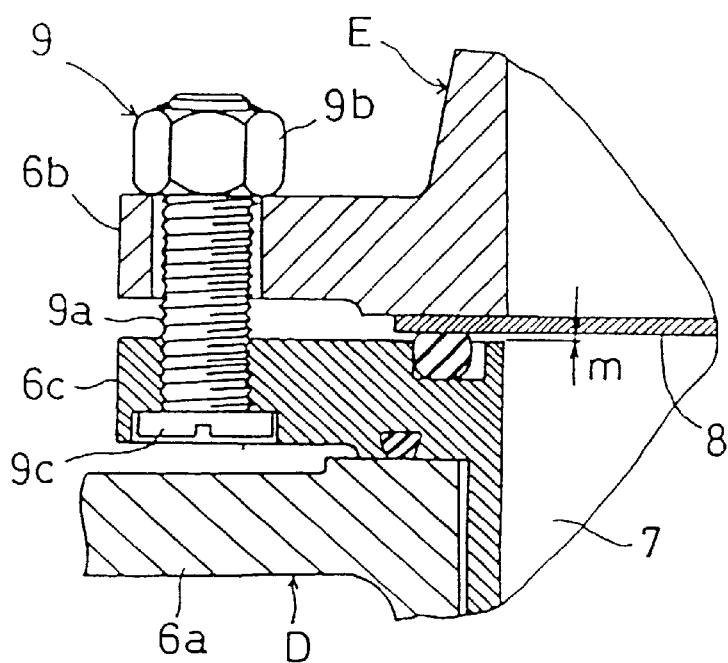
FIG. 8 is a partial section illustrating an operation for releasing the shutter plate from between the flanges.
Figure 9:
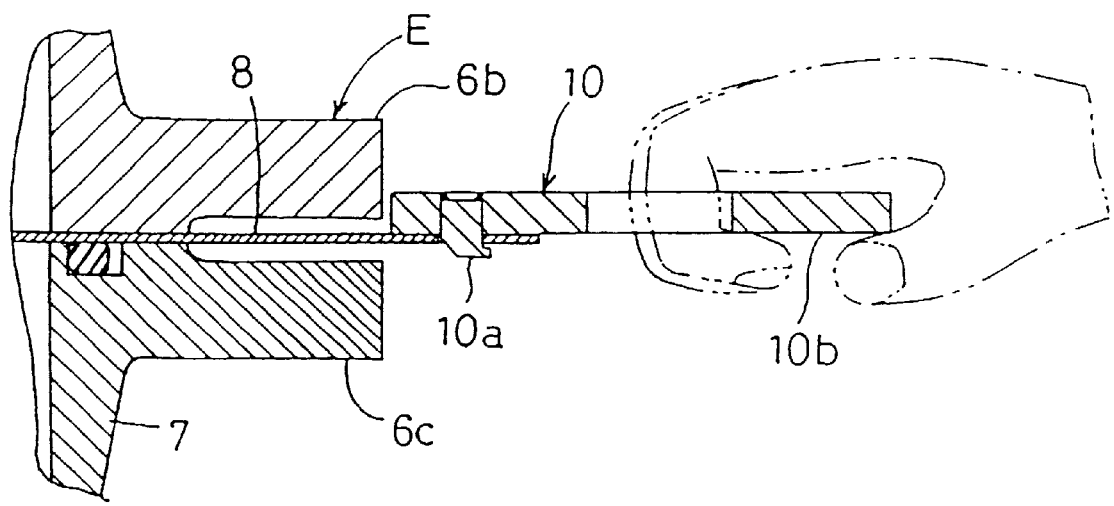
FIG. 9 is a section view illustrating an operation for withdrawing the shutter plate by means of a pulling jig.

Next, as shown in FIG. 8, the headed bolt 9a fixing the lower flange 6b and the fixing flange 6c together with binding the shutter plate 8 therebetween is rotated from the side of the nut 9b until the flat head 9c comes into abutment against the lower face of the fixing flange 6c, thereby loosening the flange joint 6. Then, as shown in FIG. 9, the pulling jig 10 made of a steel plate is hooked to the shutter plate 8 and this shutter plate 8 is withdrawn.

Figure 10:
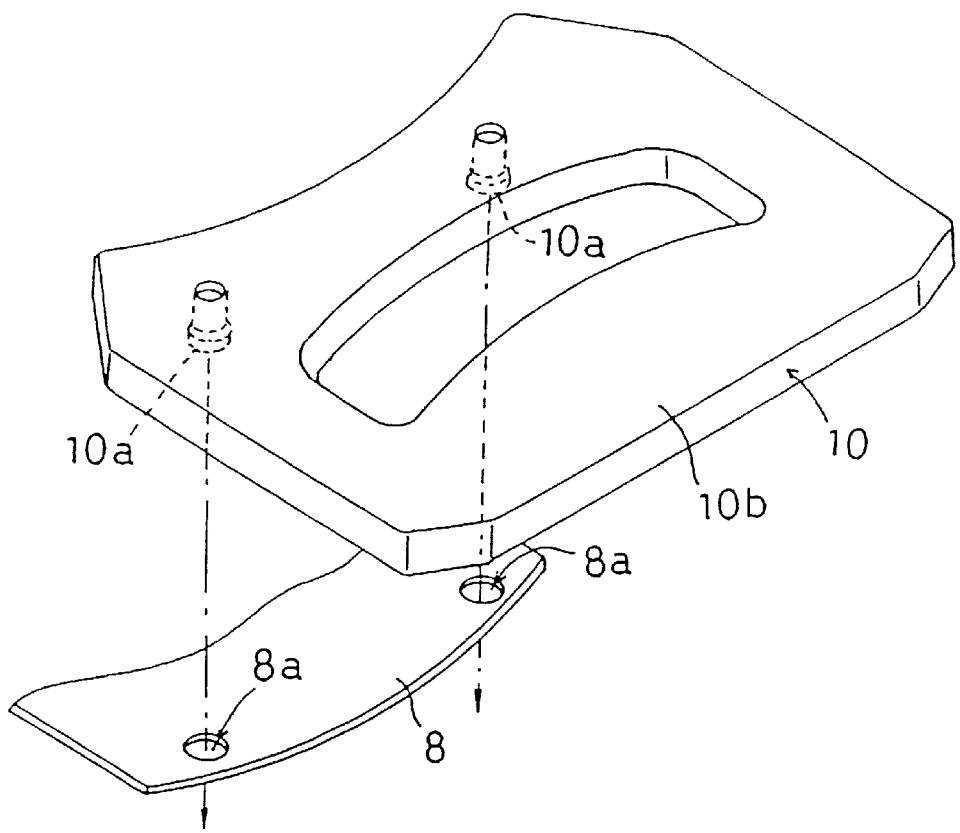
FIG. 10 is a perspective view illustrating a connected condition between the shutter plate and the pulling jig.

As shown in FIG. 10, the pulling jig 10 includes engaging projections 10a which come into the engagement with the engaging holes 8a of the shutter plate 8 and a hand-grip portion 10b. Then, with the engaging projections 10a engaged with the engaging holes 8a, the jig 10 is pulled, along the radial direction of the flanges, by being gripped at the hand-grip portion 10b, whereby the shutter plate 8 may be readily withdrawn.

Figure 11:
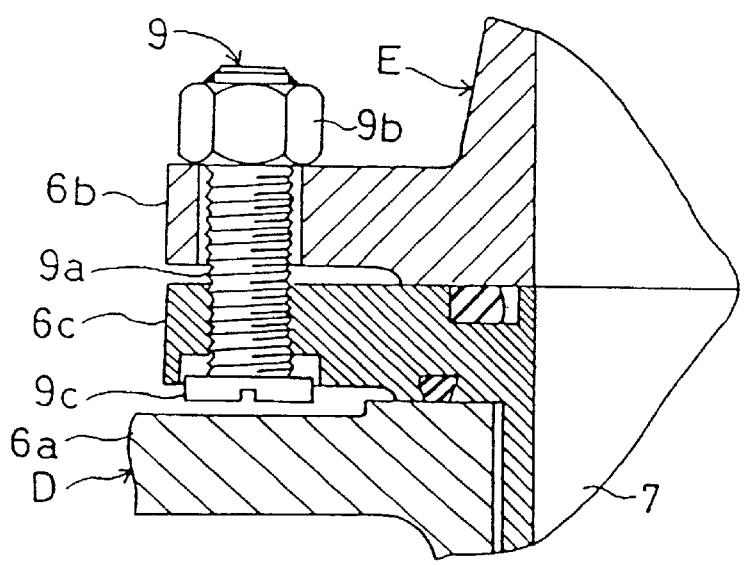
FIG. 11 is a partial section illustrating an operation for re-fixing the opposed flanges after the shutter plate has been withdrawn from therebetween.

Next, as shown in FIG. 11, the headed bolt 9a is fastened by the nut 9b so as to fix the lower flange 6b and the fixing flange 6c together. Then, as shown in FIG. 1, the nuts 11a are threaded forward on the connecting bolts 11 so as to fasten and fix the upper flange 6a, the lower flange 6b and the fixing flange 6c together constituting the flange joint 6, thereby to complete the series of branch pipe connecting operation.

Other Embodiments

1. The branch-pipe connecting method according to the present invention is not limited to the one described above for connecting a branch pipe to an existing water pipe, but may be employed for connecting a branch pipe to an existing sewage pipe.

2. The method may alternatively employs a flange joint adapted for directly connecting the branching pipe portion and the connecting pipe portion, with the shutter plate being withdrawably bound between a pair of flanges of this flange joint.

3. In a modified construction for restricting the amount of loosening of the fastener bolts, nuts may be threaded forward on fastener bolts which extend through both two flanges, with the shutter plate being bound between these flanges, and a restricting member is provided for restricting an amount of threading amount of the nuts relative to the fastener bolts.

4. The pulling jig may be fixed in advance to the shutter plate and then this shutter plate may be withdrawably fitted between the opposed flanges.

5. In the branch-pipe connecting method of the invention, a predetermined length of the existing pipe may be cut by a desired length inside the enclosure case enclosing the existing pipe and the branch-pipe joint may be connected with this cut portion for connecting and communicating the branch-pipe joint and the existing pipe with each other.

Although the present invention has been described with reference some particular embodiments, it is to be understood that these embodiments are merely illustrative of the application of the principles of the invention. Numerous modifications may be made therein and other arrangements may be devised without departing from the spirit and scope of the invention.

What is claimed is:

1. A method of connecting a branch pipe to an existing main pipe, including the steps of:
    connecting and communicating a branch-pipe joint having a branching pipe portion to an existing main pipe; connecting a branch pipe to the branch-pipe joint; and communicating the branch pipe with the existing main pipe through the branch-pipe joint, with all these steps being effected while outflow of fluid from inside the main pipe being prevented, the method comprising the steps of:
        attaching the branch-pipe joint having the branching pipe portion to the existing main pipe;
        connecting a sluice valve to the branch-pipe joint;
        connecting an enclosure case to the sluice valve, the enclosure case housing a connecting pipe portion having a flange joint and a shutter plate;
        connecting the connecting pipe portion with the branching pipe portion via the flange joint that includes a pair of flanges, wherein at least one of the pair of flanges includes means attached thereto for cooperating with the existing main pipe;
        inserting the shutter plate between the pair of flanges of the flange joint thus preventing outflow of fluid from the branching pipe portion;
        removing the sluice valve and the enclosure case from the branch-pipe joint and connecting and communicating the branch pipe to the connecting pipe portion;
        loosening the flange joint while the connecting pipe portion is kept connected with the branch pipe so as to withdraw the shutter plate from between the flanges to allow communication between the branch pipe and the branching pipe portion; and
        tightening the flange joint whereby the branch pipe and the connecting pipe portion are secured to the branch pipe joint.

2. The method according to claim 1, wherein the branch-pipe joint includes a case-forming member which is disposed about an outer peripheral face of the existing main pipe to be secured thereto and a through hole is defined in a pipe wall of the existing main pipe through the branching pipe portion so as to connect and communicate the branching pipe joint with the main existing pipe through the through hole.

3. The method according to claim 2, wherein an amount of loosening of a fastener bolt which fasten the flanges together for binding the shutter plate therebetween when the shutter plate is to be withdrawn is restricted within a predetermined range;
    the fastener bolt is threaded with one of the flanges binding the shutter plate therebetween;
    the fastener bolt includes a contact member which comes into contact with the flange as the fastener bolt is loosened, thereby to restrict the amount of loosening within the predetermined range;
    the shutter plate forms, at an end thereof, an engaging portion against which a pulling jig used for withdrawing the shutter plate from between the flanges comes into disengageable engagement; and
    the shutter plate is bound between the flanges with the engaging portion projecting from between the flanges.

4. The method according to claim 1, wherein an amount of loosening of a fastener bolt which fasten the flanges together for binding the shutter plate therebetween when the shutter plate is to be withdrawn is restricted within a predetermined range.

5. The method according to claim 4, wherein the fastener bolt is threaded with one of the flanges binding the shutter plate therebetween, and the fastener bolt includes a contact member which comes into contact with the flange as the fastener bolt is loosened, thereby to restrict the amount of loosening within the predetermined range.

6. The method according to claim 1, wherein the shutter plate forms, at an end thereof, an engaging portion against which a pulling jig used for withdrawing the shutter plate from between the flanges comes into disengageable engagement, and the shutter plate is bound between the flanges with the engaging portion projecting from between the flanges.

7. The method according to claim 1, further including the step of inserting a cylindrical member having an integrally formed closing member through the branching pipe portion so that the closing member closes a through hole defined in the existing main pipe.

8. A method of connecting a branch pipe to an existing main pipe, including the steps of:
    fixing a branch-pipe joint to an outer peripheral face of the existing main pipe, the branch-pipe joint having a passage-forming member for forming a guide flow passage between the passage-forming member and the outer peripheral face of the existing main pipe, the guide flow passage extending from a lower area to an upper area of the existing main pipe along the outer peripheral face thereof, the branch-pipe joint further having a branching pipe portion and being disposed along a radial direction of the existing main pipe so as to allow the branching pipe portion to be opened at the upper area of the guide flow passage;
    defining, through the branching pipe portion, an upper through hole in an upper pipe wall of the main existing pipe for defining a lower through hole in a lower pipe wall of the existing main pipe, the lower through hole communicating with a lower inner region of the guide flow passage;
    after defining the lower through hole, closing the upper through hole with a closing member introduced through the branching pipe portion;
    connecting a branch pipe to the branching pipe portion; and
    communicating the branch pipe with the existing main pipe through the guide flow passage and the lower through hole;

all said steps being effected while outflow of fluid from inside the main pipe being prevented, the method comprising the steps of:

attaching the branch-pipe joint having the branching pipe portion to the existing main pipe;

connecting a sluice valve to the branch-pipe joint;

communicating the branching pipe portion with the existing main pipe;

closing the sluice valve to prevent outflow of fluid from the branching pipe portion;

connecting an enclosure to the sluice valve, the enclosure case housing a connecting pipe portion having a flange joint and a shutter plate;

connecting the connecting pipe portion with the branching pipe portion via the flange joint that includes a pair of flanges, wherein at least one of the pair of flanges includes means attached thereto for cooperating with the existing main pipe;

inserting the shutter plate between the pair of flanges of the flange joint thus preventing outflow of fluid from the branching pipe portion;

removing the sluice valve and the enclosure case from the branch-pipe joint and connecting and communicating the branch pipe to the connecting pipe portion;

loosening the flange joint while the connecting pipe portion is kept connected with the branch pipe so as to withdraw the shutter plate from between the flanges to allow communication between the branch pipe and the branching pipe portion; and tightening the flange joint whereby the branch pipe and the connecting pipe portion are secured to the branch-pipe joint.

9. The method according to claim 8, wherein an amount of loosening of a fastener bolt which fasten the flanges together for binding the shutter plate therebetween when the shutter plate is to be withdrawn is restricted within a predetermined range.

10. The method according to claim 9, wherein the fastener bolt is threaded with one of the flanges binding the shutter plate therebetween, and the fastener bolt includes a contact member which comes into contact with the flange as the fastener bolt is loosened, thereby to restrict the amount of loosening within the predetermined range.

11. The method according to claim 7, wherein the shutter plate forms, at an end thereof, an engaging portion against which a pulling jig used for withdrawing the shutter plate from between the flanges comes into disengageable engagement, and the shutter plate is bound between the flanges with the engaging portion projecting from between the flanges.

12. The method according to claim 8, further including the step of inserting a cylindrical member having the closing member integrally formed therewith through the branching pipe portion so that the closing member closes the upper through hole defined in the existing main pipe.

13. A method of connecting a branch pipe to an existing main pipe while preventing outflow of fluid from inside the existing main pipe, the method comprising the steps of:

attaching a branch-pipe joint having a branching pipe portion to the existing main pipe;

connecting a sluice valve to the branch-pipe joint;

communicating the branching pipe portion with the existing main pipe;

connecting an enclosure case to the sluice valve, the enclosure case housing a connecting pipe portion having a flange joint and a shutter plate;

connecting the connecting pipe portion with the branching pipe portion via the flange joint that includes a pair of flanges, wherein at lest one of the pair of flanges includes means attached thereto for cooperating with the existing main pipe;

inserting the shutter plate between the pair of flanges of the flange joint thus preventing outflow of fluid from the branching pipe portion;

removing the sluice valve and the enclosure case from the branch-pipe joint and connecting and communicating the branch pipe to the connecting pipe portion;

loosening the flange joint while the connecting pipe portion is kept connected with the branch pipe so as to withdraw the shutter plate from between the pair of flanges to allow communication between the branch pipe and the branching pipe portion, whereby the branch pipe and the existing main pipe are communicated with each other through the branching pipe portion of the branch-pipe joint; and tightening the flange joint whereby the branch pipe and the connecting pipe portion are secured to the branch-pipe joint.

14. The method according to claim 13, further including the step of inserting a cylindrical member having an integrally formed closing member through the branching pipe portion so that the closing member closes a through hole defined in the existing main pipe.

* * * * *

UNITED STATES PATENT AND TRADEMARK OFFICE
CERTIFICATE OF CORRECTION

PATENT NO. : 5,967,168
DATED : October 19, 1999
INVENTOR(S) : Kenji Kitani et al.

It is certified that error appears in the above-identified patent and that said Letters Patent is hereby corrected as shown below:

Column 4 Line 26 after "thereof" insert period --.--.

Column 4 Line 45 "Joint D" should read --joint D--.

Column 9 Line 42, Claim 11, "according to claim 7" should read --according to claim 8--.

Column 10 Line 21, Claim 13, "wherein at lest" should read --wherein at least--.

Signed and Sealed this

Eighth Day of August, 2000

Attest:

Q. TODD DICKINSON

Attesting Officer

Director of Patents and Trademarks